United States Patent Office 3,361,677
Patented Jan. 2, 1968

3,361,677
METHOD FOR MAKING FLUORESCENT PRECIPITATION PIGMENTS
Robert W. Voedisch, Morton Grove, Ill., assignor to Lawter Chemicals, Inc., Chicago, Ill., a corporation of Delaware
No Drawing. Filed May 18, 1964, Ser. No. 368,400
12 Claims. (Cl. 252—301.2)

This invention relates to fluorescent materials and it relates more particularly to a new and improved fluorescent pigment and method for producing same and to new and improved ink compositions and flaw detection compositions embodying same.

In the U.S. Patent No. 2,809,954, description is made of daylight fluorescent compositions and pigments formulated of daylight fluorescent dyestuffs embodied within a resinous base which is formed by the reaction of toluene sulfonamide aldehyde resin and a urea aldehyde or melamine aldehyde resin. The resinous system is heated to a temperature sufficient to effect reaction of the materials for advancement to a hardened and friable state wherein the pigmented resinous reaction product can be ground to a sufficiently small particle size for use as a pigment in offset and letterpress printing inks.

While such resinous system, containing daylight fluorescent dyestuffs, can be ground down to a size suitable for use as a pigment, it has been found that the cost of grinding has been quite excessive and that the particle size to which the resinous materials can be reduced is still insufficient for many uses such as in a planographic or the like offset printing process wherein pigment particles of finer dimension are desired.

It is an object of this invention to produce and to provide a method for producing fluorescent pigments and preferably daylight fluorescent pigments of the type described having a particle size finer than that capable of being produced economically by conventional grinding procedures and it is a related object to produce and to provide a method for producing fluorescent pigments of fine particle size without the need for grinding and thereby to enable a wide range of pigment compositions and colors to be reproduced for use in the various types of printing processes.

More specifically, it is an object of this invention to produce a flocculent precipitate of fine dimension from fluorescent materials without loss in the fluorescent characteristics of the pigment that is formed thereby and without reducing the life of the matter printed with inks formulated thereof.

In accordance with the practice of this invention, the formed amide aldehyde-aryl sulfonamide aldehyde resin, without or preferably with the fluorescent dyestuff contained therein, preferably in a daylight fluorescent state, is dissolved in a dilute aqueous solution of alkali and the pigment is then precipitated in a finely divided nascent and flocculent state by the slow addition of an acid, preferably accompanied with vigorous agitation. The precipitating pigment is of a dimension as fine or finer than 0.5 micron and of a dimension small enough for formulating into an ink composition for use in offset or planographic printing as well as in letterpress or dye printing and it is of a dimension small enough for use in compositions that may be employed in the detection of flaws or cracks in the surfaces of metal and the like fabricated products. The size or dimension of the pigment particles, formed in accordance with the practice of this invention, will depend at least in part on the temperature of the solution during precipitation, the amount of agitation, and the rate of addition of the precipitating acids.

The invention can best be described with reference to examples which are hereinafter given by way of illustration, but not by way of limitation, of the practice of this invention.

*Example 1*

Cerise pigment:

65 percent by weight toluene sulfonamide-aldehyde resin (Santolite MHP—Monsanto Chemical Company)
13.29 percent by weight urea
3.00 percent by weight melamine
16.55 percent by weight paraform (91% by weight formaldehyde)
0.89 percent by weight Rhodamine 7G
1.1 percent by weight Rhodamine BX.

*Procedure.*—The toluene sulfonamide-aldehyde resin, in an intermediate stage, is reduced to a molten state and heated to a temperature of 260–275° F. with constant agitation. The urea and melamine and paraform are added and the mixture is heated to a temperature of about 220° F. until it is clear. At this point, the dyestuffs are added and the temperature is raised to about 290–300° F. over a period of about 1½ to 2 hours. It is often helpful to add water in an amount corresponding to half the weight of the paraform. When water is added with the paraform, it helps solvate the dyes and the resin ingredients.

*Example 2*

Pigment preparation—Composition:

5 parts by weight of the pigmented resin of Example 1
25 parts by weight of a 5% sodium hydroxide solution
100 parts by weight of water
70 parts by weight of 40% lactic acid.

The pigmented resin of Example 1 is dissolved in the sodium hydroxide solution and heated to a temperature within the range of 90–120° F. Upon solution, the water is added and the mixture is cooled to a temperature of about 70° F. The lactic acid is added slowly with high speed agitation of the mixture to cause the pigment to precipitate as fine flocculent nascent particles having an average dimension of less than 5 microns.

The formed precipitate is filtered and washed with cold water and the formed and washed filter cake is processed as follows to work out the water. To the foregoing there is added:

4.4 parts of an oil modified alkyd resin, viscosity 3 on the lithographic scale (Thionol 3 of Lawter Chemicals, Inc.)
1.7 parts of 470 oil, a high boiling point aliphatic hydrocarbon of Nagie Brothers The mixture is mulled, as on a glass plate, to work out the water by separation or by evaporation. At this point, the resulting ink or mixture will appear quite clear. Because of the fine pigment particles, the resulting ink will give a very smooth appearance on a Hegman grind gauge with no particles projecting above the film and with no scratches at any point.

The ink prepared from the pigment of Examples 1 and 2 is characteribed by a Hegman grind of 8. Because of the fine particle size of the pigment powder, an ink is produced which prints exceptionally well on a proof-press with good transfer from plate to paper and good distribution on the applicator rollers and plate.

*Example 3*

Red Orange pigment:

64.78 percent by weight toluene sulfonamide-aldehyde resin
13.21 percent by weight urea 2.98 percent by weight melamine
16.45 percent by weight paraform
1.45 percent by weight Azosol Brilliant Yellow 6GF
0.62 percent by weight Rhodamine 7G
0.51 percent by weight Rhodamine BX.

*Example 4*

Lemon Yellow pigment:

64.69 percent by weight toluene sulfonamide-aldehyde resin MHP
13.20 percent by weight urea
2.98 percent by weight melamine
16.43 percent by weight paraform
2.64 percent by weight Azosol Brilliant Yellow 6GF
0.06 percent by weight phthalic anhydride.

*Example 5*

Clear pigment:

66.41 percent by weight toluene sulfonamide-aldehyde resin MHP
13.55 percent by weight urea
3.05 percent by weight melamine
16.87 percent by weight paraform
1.12 percent by weight phthalic anhydride.

The pigments of Examples 3, 4 and 5 are prepared in the same manner as in Examples 1 and 2.

Instead of making use of a mixture of melamine and urea for reaction as the amide component with formaldehyde and with the paratoluene sulfonamide aldehyde, resinous systems for use in producing pigment powders in accordance with the practice of this invention can be produced with urea alone, or with melamine alone, or with benzoguanamine alone, as the amide component, or with other aryl sulfonamide aldehydes such as benzene sulfonamide aldehyde, as may be represented by the following examples:

*Example 6*

100 parts by weight para-toluene sulfonamide-aldehyde resin MHP
16.5 parts by weight urea
15.0 parts by weight water
18.1 parts by weight paraform
1.2 parts by weight Rhodamine BX.

*Example 7*

100 parts by weight para-toluene sulfonamide-aldehyde resin MHP
17 parts by weight melamine
15 parts by weight water
12 parts by weight paraform
1.3 parts by weight Rhodamine BX.

*Example 8*

59.18 parts by weight toluene sulfonamide-aldehyde resin MHP
28 parts by weight benzoguanamine
10 parts by weight paraform
0.72 part by weight Rhodamine BX
0.66 part by weight Rhodamine 7G
1.44 parts by weight Brilliant Yellow 6G base.

*Example 9*

156 parts by weight benzene sulfonamide
31 parts by weight paraform
2 parts by weight hexamine
170 parts by weight benzoguanamine
135 parts by weight formalin (37% formaldehyde)
4.8 parts by weight Azosol Brilliant Yellow 6GF
2.0 parts by weight Rhodamine 7G
1.7 parts by weight Rhodamine BX
0.4 part by weight phthalic anhydride.

The same procedure as followed in Examples 1 and 2 may be used to produce the resinous systems of Examples 6 to 9 and the preparation of daylight fluorescent pigment powders therefrom.

In the solution of the formed resinous system containing the dyestuff, it is important to avoid the use of caustic solutions which are too strong, otherwise the alkali will cause reaction of the organic resinous material into a dark gummy mass. It is desirable, however, to make use of a solution containing at least 1 percent by weight of sodium hydroxide but it is undesirable to exceed a concentration of more than 20 percent by weight of sodium hydroxide and it is preferable to make use of a solution in which the alkali is present in an amount within the range of 3 to 10 percent by weight.

Instead of sodium hydroxide, use can be made of solutions containing corresponding amounts of other alkali hydroxides such as potassium hydroxide and lithium hydroxide as the medium in which the resinous system is dissolved and from which it is precipitated upon acid solution. However, with the benzoguanamine-amide aldehyde resins, such as in Example 9, it is preferred to limit the dissolving system to a solution of sodium hydroxide.

The size of the pigment particles precipitated can be controlled in part by adjustment of the temperature of the solution at the time that the pigment particles are precipitated from solution as well as by the amount of agitation. The sizes of the particles are somewhat proportional to temperature in that the higher temperatures will produce coarser pigment particles while reduction in temperature will result in the production of finer pigment particles. The coarser particles, which are produced by precipitation at temperatures as high as 180° F. appear to be somewhat brighter than the finer particles but such finer particles find better use in the printing inks and the flaw detection compositions of this invention. Thus precipitation can be carried out at a temperature which ranges from 180° F. down to the freezing point temperature for the composition but it is preferably carried out at a temperature within the range of about 60–70° F.

Instead of lactic acid for adjustment of the pH of the composition to effect precipitation of the pigment from the alkaline solution, use can be made of other acids as represented by inorganic acids such as phosphoric acid, nitric acid and hydrochloric acid, or by organic acids such as formic acid, citric acid and the like. It is desirable to make use of an amount of acid which is insufficient to raise problems of washing out the acid from the pigment. For best use, it is desirable to effect acid additions for adjustment of the pH for precipitation to within the range of 3 to 7.

The colorless pigment powders of Example 5 can be formulated into an ink composition by formulation of the resulting clear pigment powder from the filter cake as follows:

*Example 10*

5 parts by weight of the clear pigment powder of Example 5
4.4 parts by weight of oil modified alkyd resin, viscosity 3
1.7 parts by weight of 470 oil—a high boiling aliphatic hydrocarbon oil
0.06 part by weight of Rhodamine BX
0.05 part by weight of Rhodamine 6GSW.

In the foregoing Example 10, the clear pigment powder is employed in the form of the filter cake obtained from Example 5 prior to the addition of the alkyd resin and oil for working out the water. The mixture of the filter cake, dyestuffs and vehicle is mixed and the water is flushed from the mixture by mulling. Very little of the dyestuff is flushed out with the water and a very bright cerise ink is produced.

*Example 11*

5.0 parts by weight resin of Example 1
25.0 parts by weight 5% sodium hydroxide solution in aqueous medium 0.5 part by weight isooctylphenyl ether of polyethylene glycol (wetting agent)

5.1 parts by weight oil modified alkyd resin (viscosity 3)

1.4 parts by weight of 500 oil (a high boiling aliphatic hydrocarbon oil).

The resin of Example 1, the sodium hydroxide solution and the wetting agent are mixed with a high speed mixer and then the oil modified alkyd resin and high boiling aliphatic hydrocarbon oil are slowly added.

After the pigment and vehicle have been thoroughly dispersed, 8.0 parts by weight of lactic acid is added to precipitate the pigment. The separated water is decanted off and the remaining mixture is ground on a muller until the water is removed. The bulk of the pigment is as fine as that secured in Example 1, with a small amount of oversize.

The fluorescent pigment powders produced by precipitation in a nascent, fluorescent state, in accordance with the practice of this invention, are capable of rapid and uniform distribution for formulation into ink compositions capable of use as heat set inks, offset inks, letterpress inks and other printing inks without the expense and time for additional grinding. The pigment powders are of such fine character and of such good distribution in the ink composition as to provide for a high degree of reproducibility as well as stability in the ink composition and to provide prints of good quality and color intensity. The pigment powders retain their daylight fluorescigenous energy, from which invisible light can be converted into visible light thereby to increase the amount of color issuing from the printed page when energized in daylight.

In addition to the utilization of the fine precipitated pigment powders of this invention in printing ink compositions, the fluorescent pigment powders can be formulated into compositions suitable for use with felt tipped marking pencils to provide colorless or colored images having daylight fluorescent properties or black light fluorescent properties.

Still further, the fine pigment powders precipitated from solution, in accordance with the practice of this invention, find use in writing inks with conventional pens or ball point pens since the pigment powders are fine enough for distribution in the writing ink composition and for flow in the pen in normal writing operations.

It has been found also that the fine pigment powders of this invention have excellent use in flaw detection compositions. For this purpose, the filter cake is flushed into a fine penetrating oil for uniform distribution therein in an amount within the range of 0.5 to 30 percent by weight.

In use, the pigmented penetrating oil composition is applied to the metal or other surface to be tested for flaws or cracks. The penetrating oil with the fine fluorescent pigment particles suspended therein is able to enter into the flaws or cracks existing in the treated surface. The surface is then wiped whereby the composition is removed from the surface while the portions entering the flaws or cracks remain. The small flaws or cracks can thereafter be found by examination of the surface under ultraviolet light wherein the fluorescent pigments in the surface flaws or cracks are effective to convert black light into visible light to show up the cracks or flaws. For this purpose, use can be made either of the colored pigment powders of Examples 1–4 and 6–9. The colorless pigment powders of the type produced in Example 5 can also be used in flaw detection or as an invisible security ink which is made visible by radiation with light of shorter wave lengths by formulating the colorless pigment powder with a colorless daylight fluorescent dyestuff such as Calcofluor RW of American Cyanamid Company. For this purpose, it is desirable to add the colorless daylight fluorescent material during the cooking of the resin in an amount within the range of 0.5 to 5 percent by weight. When the pigment powder is precipitated and flushed into the vehicle, an invisible ink is formed which fluoresces a brilliant blue under ultraviolet or black light.

It will be apparent from the foregoing that I have provided a new and improved means for the production of fluorescent pigment powders of fine dimension which are capable of suspension in suitable carriers for direct use as an ink or as a flaw detection composition without the need for grinding and without the need for other expensive processing steps.

It will be understood that changes may be made in the details of formulation and procedures without departing from the spirit of the invention, especially as defined in the following claims.

I claim:

1. In the preparation of a fine flocculent fluorescent pigment, the steps of dissolving an amide aldehyde- aryl sulfonamide resin and a fluorescent material in an aqueous alkaline solution, adding acid to the solution with constant agitation to reduce the pH of the solution to below 7 whereby the resin and fluorescent material precipitates as a fine flocculent fluorescent pigment, and then separating the precipitated pigment from the liquid.

2. In the preparation of a fine flocculent daylight fluorescent pigment, the steps of dissolving an amide aldehyde- aryl sulfonamide resin and a daylight fluorescent dyestuff in an aqueous alkaline solution, adding acid slowly to the solution with constant stirring to reduce the pH to below 7 whereupon the resinous material and daylight fluorescent dyestuffs precipitate as a fine flocculent daylight fluorescent pigment, and separating the precipitated pigment from the liquid.

3. The process as claimed in claim 2 in which the aqueous alkaline solution comprises the water solution of a hydroxide selected from the group consisting of alkali metal hydroxide.

4. The process as claimed in claim 3 in which the hydroxide is present in the solution in an amount within the range of 1 to 20 percent by weight.

5. The process as claimed in claim 3 in which the hydroxide is present in the solution in an amount within the range of 3 to 10 percent by weight.

6. The process as claimed in claim 2 in which the resin and dyestuff are dissolved in the aqueous alkaline solution in an amount within the range of 2 to 20 percent by weight.

7. The process as claimed in claim 2 in which the resin and dyestuff are dissolved in the aqueous alkaline solution in an amount within the range of 2 to 5 percent by weight.

8. The process as claimed in claim 2 in which the solution is effected while heating to a temperature up to about 260° F.

9. The process as claimed in claim 2 in which the acid is added while the solution is cooler to a temperature below 180° F. but above freezing temperature.

10. The process as claimed in claim 2 in which the acid is added while the solution is at a temperature within the range of about 60–70° F.

11. The process as claimed in claim 2 in which the acid is added in an amount to adjust the pH of the solution to within the range of 3–7.

12. The process for preparing a daylight fluorescent ink composition comprising the steps of dissolving an amide aldehyde-aryl sulfonamide resin in a solution of a hydroxide selected from the group consisting of an alkali metal hydroxide and ammonium hydroxide in an amount whereby the resinous material comprises 1 to 10 percent by weight of the solution, adding an acid slowly to the solution containing the dissolved resin while vigorously agitating the solution and wherein the acid is added in an amount to reduce the pH of the solution to within the range of 3–7 whereby the resinous material precipitates as a fine flocculent precipitate from the solution, separating the precipitate from the remainder, and mixing the precipitate with a fluid ink carrier and finely divided particles of a fluorescent daylight dyestuff to form a daylight fluorescent ink composition.

References Cited

UNITED STATES PATENTS

| | | | |
|---|---|---|---|
| 2,345,543 | 3/1944 | Wohnsiedler et al. | 260—67.6 |
| 2,485,079 | 10/1949 | Wohnsiedler et al. | 260—67.6 |
| 2,600,593 | 6/1952 | Weber | 260—39 |
| 2,851,424 | 8/1958 | Switzer et al. | 252—301.2 |
| 2,895,917 | 7/1959 | Gaunt | 252—301.2 |
| 2,953,536 | 9/1960 | Switzer | 252—301.2 |

TOBIAS E. LEVOW, *Primary Examiner.*

HELEN M. McCARTHY, *Examiner.*

R. D. EDMONDS, *Assistant Examiner.*